United States Patent
Isobe et al.

(10) Patent No.: US 8,346,490 B2
(45) Date of Patent: Jan. 1, 2013

(54) SENSOR-EQUIPPED BEARING FOR WHEEL

(75) Inventors: Hiroshi Isobe, Iwata (JP); Toru Takahashi, Iwata (JP); Takayoshi Ozaki, Iwata (JP)

(73) Assignee: NTN Corporation, Osaka (JP)

( * ) Notice: Subject to any disclaimer, the term of this patent is extended or adjusted under 35 U.S.C. 154(b) by 395 days.

(21) Appl. No.: 12/449,451

(22) PCT Filed: Feb. 1, 2008

(86) PCT No.: PCT/JP2008/000127
§ 371 (c)(1),
(2), (4) Date: Aug. 7, 2009

(87) PCT Pub. No.: WO2008/096525
PCT Pub. Date: Aug. 14, 2008

(65) Prior Publication Data
US 2010/0262383 A1  Oct. 14, 2010

(30) Foreign Application Priority Data
Feb. 8, 2007  (JP) .................................. 2007-028960

(51) Int. Cl.
*G01L 5/00* (2006.01)
(52) U.S. Cl. ........................................... 702/42; 702/34
(58) Field of Classification Search .................... 702/34, 702/42; 384/448; 73/114.81, 593, 862.191
See application file for complete search history.

(56) References Cited

U.S. PATENT DOCUMENTS

| | | | | |
|---|---|---|---|---|
| 6,658,943 B2 * | 12/2003 | McDearmon | | 73/795 |
| 6,955,096 B2 * | 10/2005 | Colombo et al. | | 73/862.191 |
| 7,568,842 B2 * | 8/2009 | Gempper et al. | | 384/448 |
| 2005/0016296 A1 | 1/2005 | Inoue | | |
| 2006/0232425 A1 * | 10/2006 | Ueno | | 340/572.8 |

FOREIGN PATENT DOCUMENTS

| | | |
|---|---|---|
| JP | 55-156608 | 12/1980 |
| JP | 9-61268 | 3/1997 |
| JP | 2003-530565 | 10/2003 |
| JP | 2004-142577 | 5/2004 |
| JP | 2006-077807 | 3/2006 |
| WO | 01/77634 A2 | 10/2001 |
| WO | 2005/121731 A1 | 12/2005 |

OTHER PUBLICATIONS

European Search Report dated Nov. 24, 2010 and issued in corresponding European Patent Application 08702859.3.
International Search Report for PCT/JP2008/000127, mailed Feb. 26, 2008.
English Translation of the International Preliminary Report on Patentability mailed Aug. 20, 2009 in corresponding International Patent Application PCT/JP2008/000127.
Japanese Office Action mailed Apr. 17, 2012 issued in corresponding Japanese Patent Application No. 2007-028960.

* cited by examiner

*Primary Examiner* — Mohamed Charioui
*Assistant Examiner* — Elias Desta

(57) ABSTRACT

There is provided a sensor equipped wheel support bearing assembly including an outer member having an inner periphery formed with a plurality of rolling surfaces defined therein, an inner member having an outer periphery formed with rolling surfaces opposed to those rolling surfaces and a plurality of rows of rolling elements interposed between those rolling surfaces. One of the outer and inner members serving as a stationary member is provided with a strain amplifying mechanism for amplifying a strain in the stationary member, which occurs when the rolling elements pass by. A strain sensor element is provided for detecting the strain amplified by the strain amplifying mechanism. A calculator is provided for calculating from an output of the strain sensor element, the load acting on the bearing assembly or the load acting between the vehicle wheel and the road surface.

4 Claims, 2 Drawing Sheets

SENSOR-EQUIPPED BEARING FOR WHEEL

CROSS REFERENCE TO RELATED APPLICATIONS

This application claims the benefit under 35 U.S.C. Section 371, of PCT International Application No. PCT/JP2008/000127, filed Feb. 1, 2008, which claimed is priority to the Japanese Patent Application No. 2007-028960, filed Feb. 8, 2007, which are incorporated by reference in their entirety into this application.

BACKGROUND OF THE INVENTION

1. Field of the Invention

The present invention relates to a sensor equipped wheel support bearing assembly having a load sensor built therein for the detection of a load acting on a bearing assembly of a vehicle wheel.

2. Description of the Prior Art

For safety travel of an automotive vehicle, a wheel support bearing assembly equipped with a sensor for detecting the rotational speed of each of vehicle wheels has hitherto been well known in the art. While the automobile traveling safety precaution is generally taken by detecting the rotational speed of the respective vehicle wheel arranged in various locations, it is not sufficient with only the rotational speeds of the vehicle wheels and, therefore, it is desired to achieve a control with the use of other sensor signals for safety purpose.

In view of the above, it may be contemplated to achieve the vehicle stability control based on a load acting on each of the vehicle wheels during travel of an automotive vehicle. By way of example, a large load acts on the outside wheels during the cornering, on the wheels on one side during the run along horizontally inclined road surfaces or on the front wheels during braking, and, thus, a varying load acts on the vehicle wheels. Also, even in the case of the uneven live load, the loads acting on those wheels tend to become uneven. For this reason, if the loads acting on the wheels can be detected as needed, suspension systems for the vehicle wheels can be controlled beforehand based on results of detection of the loads so that the stability control of the automotive vehicle during the traveling thereof (for example, prevention of a rolling motion during the cornering, prevention of sinking of the front wheels during braking, and prevention of sinking of the vehicle wheels brought about by an uneven distribution of live loads) can be accomplished. However, an appropriate space for installation of the load sensor for detecting the load acting on the respective vehicle wheel can hardly be found and, therefore, the stability control through the detection of the load is difficult to realize.

Also, in the event in the near future the steer-by-wire is introduced and the system, in which the wheel axle and the steering come not to be coupled mechanically with each other, is increasingly used, transmission of information on the road surface to the steering wheel held by a driver, by detecting a wheel axis direction load would come to be required.

In order to meet those needs hitherto recognized, a wheel support bearing assembly has been suggested, in which a strain gauge is affixed to an outer ring of the wheel support bearing assembly so that strains occurring in the outer ring can be detected when the rolling elements move past the outer ring. (See, for example, the Patent Documents 1 and 2 listed below.)

[Patent Document 1] Japanese Laid-open Patent Application No. 2003-530565

[Patent Document 2] International Publication No. WO 2005/121731 A1

It has however been found that in the case of the sensor equipped wheel support bearing assembly of the construction described above, the strains induced in the outer ring during the passage of the rolling elements are so small that detection with the strain gauge is difficult to achieve. In order to overcome this problem, the use is required of a strain gauge with high sensitivity, resulting in a problem associated with cost increase.

An object of the present invention is to provide a sensor equipped wheel support bearing assembly capable of easily and accurately detecting the load acting on the bearing assembly or the load acting between a vehicle wheel and a road surface.

A sensor equipped wheel support bearing assembly of the present invention is a bearing assembly for rotatably supporting a vehicle wheel relative to an automotive vehicle body, which includes an outer member having an inner periphery formed with a plurality of rolling surfaces defined therein, an inner member having an outer periphery formed with rolling surfaces opposed to the rolling surfaces in the outer member, a plurality of rows of rolling elements interposed between those rolling surfaces, a strain amplifying mechanism for amplifying a strain in a stationary member served by one of the outer and inner members, which strain occurs when the rolling elements pass by, a strain sensor element for detecting the strain amplified by the strain amplifying mechanism, and a calculator for calculating, from an output of the strain sensor element, a load acting on the bearing assembly or a load acting between the vehicle wheel and a road surface.

When a load acts on a wheel support bearing assembly or between a vehicle wheel and a road surface, a strain is induced in the stationary member of the wheel support bearing assembly, but such strain is too low for a strain gauge or the like to detect it directly. However, in the sensor equipped wheel support bearing assembly referred to above, the use is made of the strain amplifying mechanism for amplifying the strain, which is induced when the rolling elements move past one of the outer and inner members serving as the stationary member, and also of the strain sensor element for detecting the strain amplified by such strain amplifying mechanism to thereby increase the sensitivity of detection for the strain. Since as hereinabove described arrangement is made so that the load acting on the wheel support bearing assembly or the load acting between the vehicle wheel and the road surface can be calculated from an output of the strain sensor element by the calculating means, the load acting on the vehicle wheel or the load acting between the vehicle wheel and the road surface can be easily and accurately detected.

In the present invention, the stationary member may be served by the outer member, in which case an outer peripheral surface of the outer member is formed with, at least in an axial range in which the rolling surface of the outer member lies, a thin walled area having a wall thickness smaller than that of a proximity thereof, and the strain amplifying mechanism is provided at the thin walled area. The axial range referred to above, in which the rolling surface lies, is intended to mean a range in which even a portion of the rolling surface is included, and therefore may mean, for example, a range including a portion that is merely radially opposed to an axial end of such rolling surface.

The provision of the thin walled area as referred to above is effective to allow the strain amplifying mechanism to amplify the strain in the outer member which comes to be higher than that in other locations when the rolling elements pass by and, therefore, the detecting sensitivity can be increased correspondingly.

Where the bearing assembly is an angular contact ball bearing, the strain amplifying mechanism is preferably arranged at a location where a line of action of the angular contact ball bearing intersects a radially outward surface of the thin walled area. According to this feature, when the rolling elements move past the thin walled area in the outer member, the strain induced in the thin walled area of the outer member can be effectively amplified by and generated from the strain amplifying mechanism.

The strain amplifying mechanism may include a strain generating member connecting between the thin walled area in the outer member and a portion proximate to the thin walled area, in which case a cutout is provided in a portion of this strain generating member with the strain sensor element provided in the cutout.

In the case of this construction, owing to the cutout, the strain in the outer member can be effectively amplified and transmitted to the location where the strain sensor element is installed and, therefore, the detecting sensitivity can be increased correspondingly.

The thin walled area may include a groove provided in the outer peripheral surface of the outer member so as to extend axially.

The thin walled area may be provided at four locations upwardly, downwardly, leftwards and rightwards of the outer member. If the thin walled area, where the strain amplifying mechanism is provided, is provided at the four locations each arranged upwardly, downwardly, leftwards and rightwards of the outer member, loads acting in various directions can be detected.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

A sensor equipped wheel support bearing assembly according to a preferred embodiment of the present invention will now be described in detail with particular reference to FIGS. 1A to 3. This embodiment is applied to a third generation model of a wheel support bearing assembly of an inner ring rotating type that is used for the support of a vehicle drive wheel. It is to be noted that hereinafter in this specification, terms "outboard" and "inboard" represent one side of a vehicle body away from the longitudinal center of the vehicle body and the other side of the vehicle body close to the longitudinal center of the vehicle body, respectively, when assembled in the vehicle body.

Figure 1B:
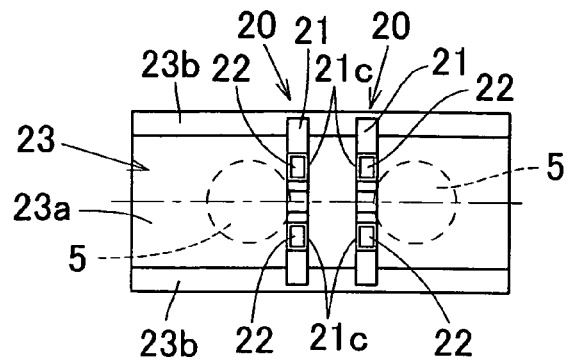
FIG. 1B is a plan view showing a sensor unit accommodating area as viewed in a direction conforming to the arrow-headed line C in FIG. 1A.
Figure 1A:
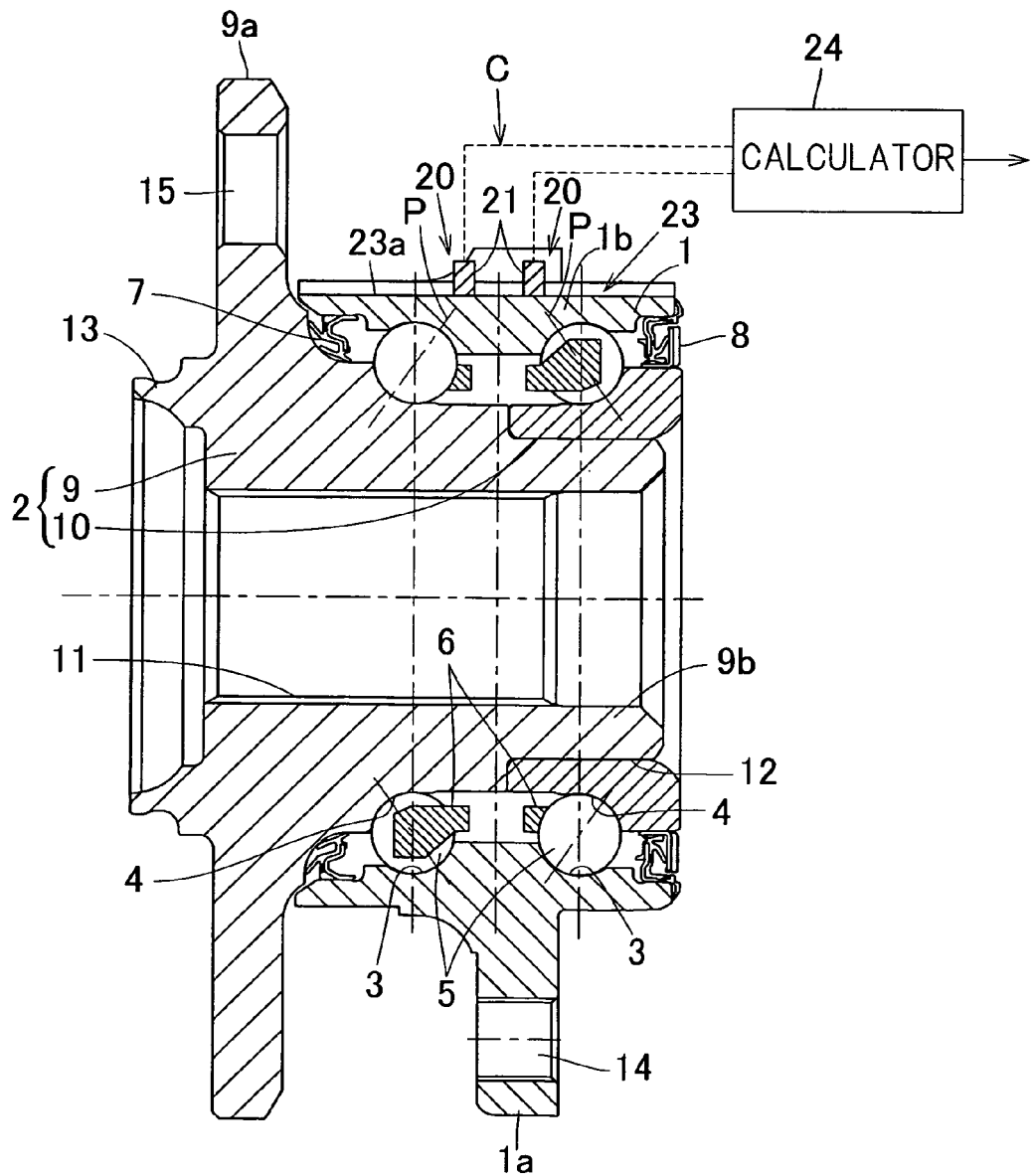
FIG. 1A is a sectional view showing a sensor equipped wheel support bearing assembly according to a preferred embodiment of the present invention.

A bearing unit in the sensor equipped wheel support bearing assembly includes, as shown in a sectional representation in FIG. 1A, an outer member 1 having an inner periphery formed with a plurality of rolling surfaces 3, an inner member 2 formed with rolling surfaces 4 opposed respectively to the rolling surfaces 3, and a plurality of rows of rolling elements 5 interposed between the rolling surfaces 3 and 4 in the outer and inner members 1 and 2. This wheel support bearing assembly is rendered to be a double-row angular contact ball bearing type, in which the rolling elements 5 are employed in the form of balls that are retained by a retainer 6 employed for each of the rows. The rolling surfaces 3 and 4 referred to above represent arcuate sectional shapes and are so formed as to represent respective ball contact angles that are held in back-to-back relation with each other. Opposite ends of a bearing space delimited between the outer member 1 and the inner member 2 are sealed respectively by outboard and inboard sealing units 7 and 8.

The outer member 1 serves as a stationary member and is of one-piece construction having an outer periphery formed with a flange 1a that is secured to a knuckle forming a part of the automobile suspension system (not shown) mounted on an automotive body structure. The flange 1a is provided with vehicle body fitting holes 14 at respective locations spaced in a direction circumferentially thereof.

The inner member 2 serves as a rotating member and is made up of a hub unit 9 having a wheel mounting hub flange 9a, and an inner ring 10 mounted on an outer periphery of an inboard end of an hub axle 9b of the hub unit 9. The rolling surfaces 4 are formed on the hub unit 9 and the inner ring 10, respectively. The inboard end of the hub unit 9 has its outer periphery provided with an inner ring mounting surface 12 which is radially inwardly stepped to have a small diameter, and the inner ring 10 is mounted on this inner ring mounting surface 12. The hub unit 9 has a center bore 11 defined therein so as to extend therethrough. The hub flange 9a is provided with a plurality of press-fitting holes 15 defined at respective locations circumferentially thereof for receiving corresponding hub bolts (not shown). At a portion of the hub unit 9 adjacent the root of the hub flange 9a, a cylindrical pilot portion 13 for guiding a vehicle wheel and a brake component parts (both not shown) protrudes towards the outboard side.

Figure 2:
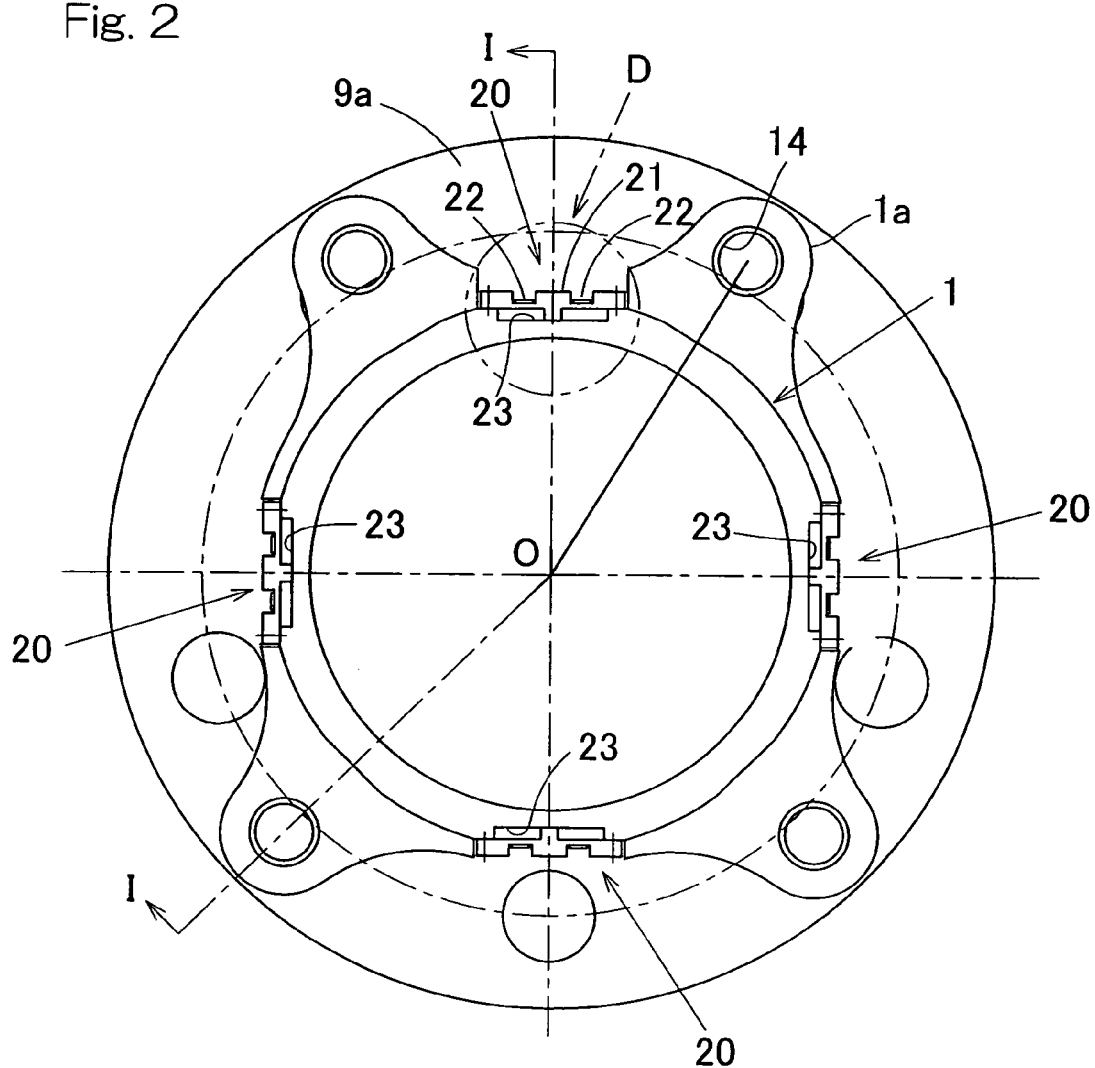
FIG. 2 is a front elevational view showing the sensor equipped wheel support bearing assembly as viewed from an inboard side.

FIG. 2 illustrates a front elevational view of the wheel support bearing assembly as viewed from the inboard side. It is to be noted that FIG. 1A illustrates a cross sectional view taken along the line I-O-I in FIG. 2.

The outer member 1, which serves as the stationary member, has an outer peripheral surface, on which a sensor unit 20 for detecting a strain induced in the outer member 1 is mounted. This sensor unit 20 is made up of a strain amplifying mechanism 21 for amplifying the strain induced in the outer member 1 when the rolling elements 5 pass by, and a strain sensor element such as, for example, a strain gauge for detecting the strain which has been amplified by the strain amplifying mechanism 21.

Figure 3:
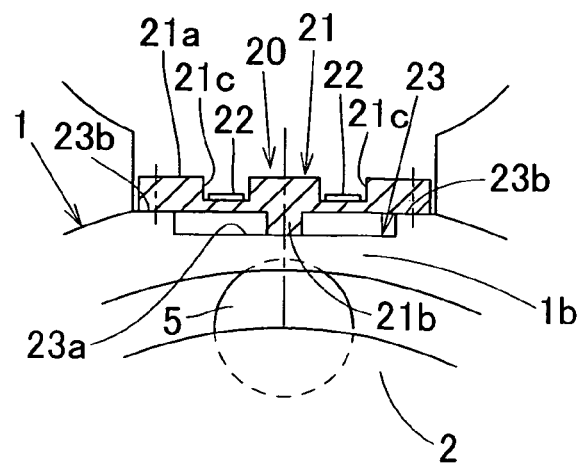
FIG. 3 is an enlarged view showing a portion indicated by D in FIG. 2.

As shown in FIG. 2, the sensor unit 20 is provided at four locations corresponding respectively to upper, lower, left and right portions of the outer member 1. As illustrated in FIG. 3 showing a portion of FIG. 2, indicated by D, on an enlarged scale, each of the locations on the outer member 1 where the respective sensor units 20 are mounted, is rendered to be a thin walled area 1b having a wall thickness smaller than that of the proximity thereof. The thin walled area 1b is made in the form of an axially extending groove 23 having a bottom surface 23a represented by a flat bottom surface formed by processing or forming, on the outer peripheral surface of the outer member 1. In other words, the four locations each arranged upwardly, downwardly, leftwards and rightwards of the outer member 1 are rendered to be thin walled areas 1b, respectively. A pair of edge portions 23b on respective sides of each of the grooves 23 in a circumferential direction are also rendered to be flat surfaces that are parallel to the respective bottom surface 23a. FIG. 1B shows a top plan view of each of the grooves 23 as viewed in a direction indicated by the arrow-headed line C in FIG. 1A. As shown in FIGS. 1A and 1B, each of the grooves 23 are formed so as to extend from an outboard end of the outer member 1 to an inboard end thereof, but the groove 23 (and, hence, the thin walled area 1b) may be formed at least in an axial range in which the rolling surface 3 of the outer member 1 lies.

The strain amplifying mechanism 21 is of one-piece construction including a bridge piece 21a of a band shaped configuration having its opposite ends secured by means of, for example, bolts to the opposite open edge portions 23b and 23b of each of the grooves 23 while it straddles the respective groove 23, and a leg piece 21b protruding from a lower surface intermediate portion of the bridge piece 21a and fixed to or held in contact with the bottom surface 23a of the groove 23. In other words, this strain amplifying mechanism 21 is rendered to be a strain generating member connecting between the thin walled area 1b (the bottom surface 23a of the groove 23) of the outer member 1 and a proximity of such thin walled area 1b (the opposite open edge portions 23b of the groove 23), and the strain occurring in the respective thin walled areas 1b of the outer member 1 is amplified at the bridge piece 21a of the strain amplifying mechanism 21. The strain generating member forming the strain amplifying mechanism 21 is made of a metallic material such as, for example, a steel material.

The bridge piece 21a of the strain amplifying mechanism 21 is provided, for example, in an upper surface thereof, with a cutout 21c at an intermediate location between a center portion corresponding to the leg piece 21b and each of the opposite ends of the bridge piece 21a. The strain sensor element 22 is fixedly provided in each of those cutouts 21c.

The strain amplifying mechanism 21 is arranged in respective axial range in the thin walled area 1b of the outer member 1, where the rolling surfaces 3 are formed. In the illustrated embodiment, the strain amplifying mechanism 21 on the outboard side as shown in FIG. 1A is arranged at an axial location, where a portion thereof overlaps an inboard end of the outboard rolling surface 3 when viewed in a radial direction, whereas the strain amplifying mechanism 21 on the inboard side is arranged at an axial location, where a portion thereof overlaps an outboard end of the inboard rolling surface 3 when viewed in a radial direction. As a result, the respective axial locations of those two strain amplifying mechanisms 21 are so chosen as to lie intermediate between the double rows of the rolling elements 5 and 5. More specifically, those two strain amplifying mechanisms 21 and 21 are axially arranged in line so that the leg pieces 21b thereof are positioned at respective sites where, when the rolling elements 5 rolling on and along the respective rolling surfaces 3 for those rows move past the thin walled areas 1b of the outer member 1, the line P of action of the rolling elements 5 intersects the bottom surface 23a of the groove 23, that is, a radially outward surface of the thin walled area 1b. The line of action referred to above means a straight line extending between the point of contact of the rolling elements 5 with the rolling surfaces 3 and the center of the rolling elements 5. In the illustrated embodiment, the strain amplifying mechanisms 21 are so arranged at the above described positions that when the rolling elements 5 move past each of the thin walled areas 1b of the outer member 1, the strain induced in the thin walled area 1b can be effectively amplified by and generated from the strain amplifying mechanisms 21. The present invention, however, is not necessarily limited to this embodiment and the strain amplifying mechanisms 21 may be arranged at different positions, provided that the leg pieces are located where large strains are induced during the passage of the rolling elements 5.

As best shown in FIG. 1A, the strain sensor element 22 of each of the sensor units 20 is connected with a calculator 24. The calculator 24 calculates, from an output of the strain sensor element 22, a load acting on the wheel support bearing assembly or a load acting between the vehicle wheel and a road surface. This calculator 24 is in the form of a microcomputer or any other electronic circuit and is provided as a circuit substrate or a circuit chip or is provided in an electric control unit (ECU) of the automotive vehicle. The calculator 24 makes use of a relation setter (not shown) such as, for example, a table or a computing equation which sets the relation between an output of the strain sensor element 22 and the load in order to output a calculated value of the load from the output of the strain sensor element 22.

In the event that a load acts on a wheel support bearing assembly or between the vehicle wheel and the road surface, a strain is also induced in the outer member, which serves as the stationary member of the wheel support bearing assembly, but such strain is too low to be detected directly by a strain gauge. In the sensor equipped wheel support bearing assembly as described hereinabove, since the outer member 1 is provided with a strain amplifying mechanism 21 for amplifying the strain in the outer member 1, which is induced when the rolling elements 5 pass by and also with a strain sensor element 22 for detecting the strain amplified by this strain amplifying mechanism 21 to thereby increase the detecting sensitivity. Since the load acting on the wheel support bearing assembly or the load acting between the vehicle wheel and the road surface is calculated by the calculator 24 from the output of the strain sensor element 22, the load acting on the wheel support bearing assembly or the load acting between the vehicle wheel and the road surface can be detected easily and accurately.

Also, in the illustrated embodiment, since the thin walled area 1b having a wall thickness smaller than the proximity is provided in the axial range of the outer member 1, where the rolling surfaces 3 are formed, which outer member serves as the stationary member, and the strain amplifying mechanism 21 referred to above is provided at this thin walled area 1b, the strain in the outer member which comes to be higher than that in other locations when the rolling elements 5 pass by, can be amplified by the strain amplifying mechanism 21 and, therefore, the sensitivity of detection of the strain can be increased correspondingly.

Moreover, in the embodiment hereinbefore fully described, since the thin walled area 1b, where the strain amplifying mechanism 21 is provided, is provided at the four locations corresponding to the upper, lower, left and right portions of the outer member 1, it is possible to detect the load acting in various directions, for example, directions upwardly and downwardly, longitudinally and transversely of the automotive vehicle.

Furthermore, in the embodiment hereinbefore fully described, since the strain generating member connecting between the thin walled area 1b (the bottom surface 23a of the groove 23) in the outer member 1 and the proximity to this thin walled area 1b (the open edge portions 23b of the groove 23) is rendered to be the strain amplifying mechanism 21 and the strain sensor element 22 is provided in the cutout 21c defined in a portion of the strain generating member, to thereby form the sensor unit 20, the strain in the outer member 1 can be effectively amplified and then transmitted to where the strain sensor element 22 is installed and, therefore, the detecting sensitivity can be correspondingly increased.

The present invention can be equally applied to a single row angular contact ball bearing other than the double row angular ball contact bearing referred to in the foregoing description of the embodiment of the present invention. Also, the present invention is not necessarily limited to the angular ball contact bearing and may be applied generally to any other rolling bearings including, for example, a deep groove ball bearing or a tapered roller bearing.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A sensor equipped wheel support bearing assembly for rotatably supporting a vehicle wheel relative to an automotive vehicle body, comprising:
    an outer member having an inner periphery formed with a plurality of rolling surfaces defined therein;
    an inner member having an outer periphery formed with rolling surfaces opposed to the rolling surfaces in the outer member;
    a plurality of rows of rolling elements interposed between those rolling surfaces;
    a strain amplifying mechanism to amplify a strain in a stationary member served by the outer member, which strain occurs when the rolling elements pass by;
    a strain sensor element fixed to the strain amplifying mechanism to detect the strain amplified by the strain amplifying mechanism; and
    a calculator to calculate, from an output of the strain sensor element, a load acting on the bearing assembly or a load acting between the vehicle wheel and a road surface,
    wherein the outer member has an outer peripheral surface formed with a thin walled area, in the form of a groove extending axially, having a wall thickness smaller than that of a proximity thereof,
    the strain amplifying mechanism includes a bridge piece provided across the groove with opposite ends of the bridge piece being secured to opposite open edge portions of the groove, and a leg piece protruding from the bridge piece and fixed to or held in contact with the bottom surface of the groove, and
    the strain sensor element is fixed to a cutout that is provided in the bridge piece.

2. The sensor equipped wheel support bearing assembly as claimed in claim 1, wherein the thin walled area is formed in at least in an axial range in which the rolling surface of the outer member lies, of the outer member.

3. The sensor equipped wheel support bearing assembly as claimed in claim 1, wherein the bearing assembly is an angular contact ball bearing and the strain amplifying mechanism is arranged at a location where a line of action of the angular contact ball bearing intersects a radially outward surface of the thin walled area.

4. The sensor equipped wheel support bearing assembly as claimed in claim 1, wherein the thin walled area is provided at four locations each arranged upwardly, downwardly, leftwards and rightwards of the outer member.

* * * * *

UNITED STATES PATENT AND TRADEMARK OFFICE
CERTIFICATE OF CORRECTION

PATENT NO. : 8,346,490 B2
APPLICATION NO. : 12/449451
DATED : January 1, 2013
INVENTOR(S) : Hiroshi Isobe et al.

It is certified that error appears in the above-identified patent and that said Letters Patent is hereby corrected as shown below:

In the Specifications:

Column 1, Line 8, After "claimed" delete "is".

Signed and Sealed this
Fourth Day of June, 2013

Teresa Stanek Rea
*Acting Director of the United States Patent and Trademark Office*